Nov. 16, 1965     H. A. LETTERON     3,218,185
TAPE HAVING THERMOPLASTIC NON-BLOCKING LAYER
Filed March 27, 1962
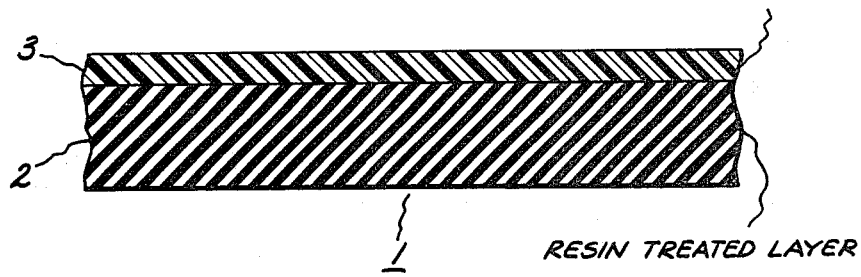
Inventor:
Henry A. Letteron,
by Howard J. Schlansker
His Attorney.

United States Patent Office 3,218,185
Patented Nov. 16, 1965

3,218,185
TAPE HAVING THERMOPLASTIC
NON-BLOCKING LAYER
Henry A. Letteron, Schenectady, N.Y., assignor to General Electric Company, a corporation of New York
Filed Mar. 27, 1962, Ser. No. 182,933
1 Claim. (Cl. 117—21)

This invention relates to tapes. More particularly, it relates to resin impregnated tape or sheet material which is characterized by non-blocking or easy separation when wound up in roll form in the uncured state without the use of separate parting layers.

It is well known in the art that when tapes are impregnated with uncured viscous resins and wound up in rolls for later use, the binder or impregnating material tends to migrate to the interface between the turns, causing successive layers of tape to become adherent. Then, when the tape is subsequently unwound for use, the sticking or adhesion between the turns causes rupturing and tearing of the tape layers making it useless for its intended purpose. As a result, many tapes, particularly those containing fragile materials, such as reconstituted mica or mica mat, and the like, when prepared in roll form, are provided with interleaving, tear-resistant surfaces, such as of glass cloth, rope paper or nonadherent resin films or combinations of these materials to facilitate unwinding of the roll without destroying the material. The non-blocking or interleaving layer is discarded when the tape is used and represents an economic loss as well as extra bulk. Attempts have been made to overcome this deficiency by providing tape material with strong backing layers on either side so that no blocking or adhering is experienced. However, while a single strong backing layer on one side of a tape is very desirable to impart tensile and tear strength, a second facing often interferes with efficient application of the tape by causing buckling and wrinkling. This second facing is also usually more expensive than the usual interleaving or non-blocking layers and merely adds to the cost and space occupied by the tape while adding nothing to its final use. Another attempted solution to this problem consists of powdering the free surface of the tape with dry powder, such as talc, mica dust, metallic stearates, and the like, to prevent blocking. However, it has been found that the liquid impregnants in the tapes permeate such powders and render them ineffective as parting or non-blocking agents. Even tapes having single layers are subject to such blocking. From the above, it will be quite apparent that there is a definite need for improved means to prevent the layers of rolled tape impregnated with liquid or viscous resin binders from sticking together or blocking into a solid mass before actual use.

Accordingly, it is a principal object of this invention to provide a simple improved means for overcoming the above difficulties.

Briefly, the invention comprises adding to the surface of tape or sheet which is to be prepared in roll form a powdered thermoplastic material which is characterized by the fact that it has no sharp melting point or high fluidity at elevated temperatures. Typical of such materials are polyethylene, polypropylene, polybutylene, polystyrene, polyvinyl acetate, polyacrylate, cellulose acetate, cellulose acetobutyrate and polyvinyl acetals among others. According to the invention, the thermoplastic resin is applied to the surface of the material in finely powdered form and sintered or melted until it presents a resin surface which serves to separate the successive layers of tape formed from the material.

Those features of the invention which are believed to be novel are set forth with particularity in the claims appended hereto and the drawing in which the single figure is a partial cross-sectional view of an embodiment of the invention. The invention will, however, be better understood from a consideration of the following description. While this description is largely concerned with electrical insulating tapes it will be realized that the invention is useful also for non-blocking tapes in general.

It has been found that thermoplastic resins as above having a particle size of from about 100 mesh and smaller are suitable in connection with the invention. The powder surfaces employed in the invention are particularly advantageous in that, while they are being sintered or melted at temperatures ranging from about 125° C. to 160° C. and upward for about one minute, depending upon the particular resin used, they present a permeable or discontinuous surface which permits the evolution of any volatiles within the resin-impregnated tape. This obviates the formation of bubbles or gas pockets within the tape and permits any gases formed to escape readily. The thickness of the final resin film will depend upon the amount of sintered material added. In general, it has been found adequate to provide a finished parting surface which is from about 0.01 to 0.4 mil in thickness and preferably from about 0.05 mil to 0.2 mil in thickness. It will be realized at once by those skilled in the art that these thicknesses would not be readily obtainable with discrete, separately applied, films and represent a distinct advantage over the prior art.

The following examples will illustrate the practice of the invention, it being realized that such examples are illustrative only of the many advantages of the invention.

*Example 1*

Mica mat about 2 mils thick backed with glass cloth about 1.7 mils thick was impregnated with a solution consisting of by weight 85% of a polyester consisting of a complex ester of propylene glycol and Nadic anhydride (Nadic anhydride is the adduct of cyclopentadiene and maleic anhydride) and 15% methylethyl ketone using about 3 ounces per square yard and wound on a core. Several weeks later, an attempt was made to unwind the roll, but it was found to be so sticky that the mica mat layer was damaged by adhesion simultaneously to both adjoining glass cloth surfaces. The roll was then placed in a 100° C. oven for one hour after which it was found that the resin solution was fluid enough while hot to allow unwinding without damage. While still hot, the material was unwound and rewound on another core while dusting both surfaces with 200 mesh powdered polyethylene resin using about 0.21 ounce per square yard. The material so treated was passed through a horizontal oven at such rate that the material was exposed to a temperature of 160° C. for about two minutes. As the material entered the oven, the resin-bonded and impregnated glass cloth-mica mat material exhibited a whitish, dusty appearance but as it left the oven, no such dusty appearance was exhibited and the mica mat surface had the normal greenish-brown appearance of resin-treated mica mat and had a thermoplastic resin film thereon about 0.28 mil thick. The 13-inch wide roll so formed was slit into 1-inch widths and rewound on smaller cores. About eight months after slitting, samples of the tapes were examined and found to be suitable for electrical insulation. Most importantly, it was found that the mica mat-glass cloth tape formed a bonded laminate which unwound freely with no damage to the mica mat surface or adhering of one turn to another.

*Example 2*

A composite laminate consisting of 2-mil thick mica mat or paper and 1.7-mil thick glass cloth was treated with an alkyd resin at the rate of about 2.7 ounces per square yard and wound on a cardboard core. Analysis showed 33% resin and 6.2% volatile solvent producing a laminate which was too soft, wet and sticky to be used as an insulating tape. One hundred feet of this laminate were dusted with about 0.3 ounce per square yard of a 200 mesh polyethylene resin (equivalent to a film about 0.39 mil thick) and wound on a core, after passing through a horizontal oven at such a rate that it was exposed successively to 110° C. for 5 minutes and to 125° C. for 5 minutes. One week later, it was found that the material dusted with powdered polyethylene unwound freely and showed no damage whatsoever to the mica mat layer. On the other hand, another portion of the laminate which had simply been dried under heat without dusting until it presented a non-tacky surface exhibited excessive sticking on unwinding.

Referring to the drawing, there is shown a resin-treated tape 1 having a resin-treated layer 2 superimposed upon which there is a layer 3 of the fused powdered thermoplastic resin as described above, layer 3 serving as a non-blocking layer when the tape is assembled in roll form.

From the above, it will be quite apparent that there are provided by the present invention non-blocking and easily handled tapes and sheets which find application wherever non-blocking impregnated tapes are required. Such tapes are particularly useful for general electrical insulating purposes and after application can be molded under heat or heat and pressure to a solid unitary mass. They are particularly useful for insulating armature coils, field coils, impulse coils, control units, transformer coils, and the coils of induction heaters. The materials of the present invention are also suitable for applications, such as in capacitors, where the insulating material coated with its parting film can be interleaved with or bonded to foil to construct the capacitor roll.

What I claim as new and desire to secure by Letters Patent of the United States is:

An insulating tape adapted to be wound into rolled form having a coating of uncured resin thereon, a thin continuous non-blocking surface film on the uncured coating, said non-blocking surface film comprising a thin layer of sintered powdered material having in its unfused state a particle size of about 100 mesh and smaller, said materials being selected from the group consisting of polyethylene, polypropylene, polybutylene, polystyrene, polyvinyl acetate, polyacrylate, cellulose acetate, cellulose acetobutyrate and polyvinyl acetal, said non-blocking film being characterized by the fact that it has no definite melting point and no fluidity at elevated temperatures of about 125° C. to 160° C. and upward.

References Cited by the Examiner
UNITED STATES PATENTS

| 2,254,483 | 9/1941 | Hess et al. | 117—21 |
| 2,450,083 | 9/1948 | Donaldson | 117—68.5 |
| 2,513,434 | 7/1950 | Tinsley | 117—21 |
| 2,561,063 | 7/1951 | McBurney et al. | 117—68.5 |
| 2,711,985 | 6/1955 | Olson | 117—16 |
| 2,764,509 | 9/1956 | Ritson et al. | 117—68.5 |
| 2,885,293 | 5/1959 | Haskell et al. | |
| 2,895,939 | 7/1959 | Stober et al. | |
| 2,915,413 | 12/1959 | Ragan et al. | 117—38 |

FOREIGN PATENTS 527,857 7/1956 Canada.

JOSEPH B. SPENCER, *Primary Examiner.*
RICHARD D. NEVIUS, *Examiner.*